(12) United States Patent
Zhang

(10) Patent No.: US 10,260,854 B2
(45) Date of Patent: Apr. 16, 2019

(54) PULSED EDDY CURRENT CASING INSPECTION TOOL

(71) Applicant: Jun Zhang, Houston, TX (US)

(72) Inventor: Jun Zhang, Houston, TX (US)

(73) Assignee: Probe Technology Services, Inc., Fort Worth, TX (US)

( * ) Notice: Subject to any disclaimer, the term of this patent is extended or adjusted under 35 U.S.C. 154(b) by 173 days.

(21) Appl. No.: 15/372,183

(22) Filed: Dec. 7, 2016

(65) Prior Publication Data

US 2018/0156936 A1    Jun. 7, 2018

(51) Int. Cl.
*G01V 3/10* (2006.01)
*G01V 3/18* (2006.01)
(Continued)

(52) U.S. Cl.
CPC ............ *G01B 7/10* (2013.01); *E21B 47/0905* (2013.01); *G01B 7/12* (2013.01); *G01B 7/13* (2013.01);
(Continued)

(58) Field of Classification Search
CPC ... G01V 3/26; G01V 3/28; G01V 3/18; G01V 2003/084; G01V 3/08; G01V 3/081; G01V 3/083; G01V 3/10
(Continued)

(56) References Cited

U.S. PATENT DOCUMENTS

| | | |
|---|---|---|
| 4,188,577 A | 2/1980 | Mhatre et al. |
| 4,292,589 A | 9/1981 | Bonner |

(Continued)

FOREIGN PATENT DOCUMENTS

| | | |
|---|---|---|
| CN | 201322740 | 10/2009 |
| WO | WO02014035285 | 3/2014 |
| WO | WO02014175785 | 10/2014 |

OTHER PUBLICATIONS

PCT/US2017/060531 International Search Report dated Jan. 18, 2018.

(Continued)

*Primary Examiner* — Huy Q Phan
*Assistant Examiner* — Raul J Rios Russo
(74) *Attorney, Agent, or Firm* — Timothy M. Honeycutt

(57) ABSTRACT

Various downhole logging tools and methods of using and making the same are disclosed. In one aspect, a downhole logging tool for inspecting one or more well tubulars includes a housing adapted to be supported in the one or more well tubulars by a support cable. A first transmitter, a second transmitter and a third transmitter are positioned in longitudinally spaced-apart relation in the housing and are operable to generate magnetic fields. Driving circuitry is operatively coupled to the first transmitter, the second transmitter and the third transmitter to selectively fire the first transmitter, the second transmitter and the third transmitter in multiple transmission modes to generate magnetic fields to stimulate pulsed eddy currents in the one or more well tubulars. A first receiver is positioned in the housing to sense decaying magnetic fields created by the pulsed eddy currents. Electronic circuitry is operatively coupled to the first receiver to determine a parameter of interest of the one or more well tubular from the sensed decaying magnetic fields.

30 Claims, 14 Drawing Sheets

(51) Int. Cl.
| | |
|---|---|
| *G01B 7/06* | (2006.01) |
| *G01V 3/26* | (2006.01) |
| *G01V 3/08* | (2006.01) |
| *G01B 7/12* | (2006.01) |
| *G01B 7/13* | (2006.01) |
| *G01V 3/28* | (2006.01) |
| *E21B 47/09* | (2012.01) |

(52) U.S. Cl.
CPC ............... *G01V 3/08* (2013.01); *G01V 3/18* (2013.01); *G01V 3/26* (2013.01); *G01V 3/28* (2013.01); *G01V 2003/084* (2013.01)

(58) Field of Classification Search
USPC ....... 324/239, 323, 329, 330, 332, 334, 338, 324/339, 346, 351
See application file for complete search history.

(56) References Cited

U.S. PATENT DOCUMENTS

| | | | |
|---|---|---|---|
| 5,233,297 A | 8/1993 | Lara | |
| 5,532,591 A | 7/1996 | Logue | |
| 6,344,739 B1 | 2/2002 | Hardy et al. | |
| 6,911,826 B2 | 6/2005 | Plotnikov et al. | |
| 7,005,851 B2 | 2/2006 | May et al. | |
| 7,206,706 B2 | 4/2007 | Wang et al. | |
| 7,389,206 B2 | 6/2008 | Plotnikov | |
| 7,402,999 B2 | 7/2008 | Plotnikov et al. | |
| 7,960,969 B2 | 6/2011 | Mouget et al. | |
| 9,562,877 B2 | 2/2017 | Khalaj Amineh et al. | |
| 2001/0038287 A1 | 11/2001 | Amini | |
| 2003/0090269 A1* | 5/2003 | Fanini | G01V 3/28 324/339 |
| 2004/0189289 A1 | 9/2004 | Atherton | |
| 2004/0207403 A1* | 10/2004 | Fanini | G01V 3/28 324/339 |
| 2004/0245997 A1 | 12/2004 | Plotnikov et al. | |
| 2005/0068026 A1 | 3/2005 | May et al. | |
| 2005/0167100 A1* | 8/2005 | Itskovich | A23B 4/031 166/248 |
| 2005/0264284 A1 | 12/2005 | Wang et al. | |
| 2006/0132124 A1 | 6/2006 | Togo et al. | |
| 2006/0217908 A1 | 9/2006 | Wang et al. | |
| 2007/0199696 A1 | 8/2007 | Walford | |
| 2007/0222439 A1 | 9/2007 | Wang et al. | |
| 2008/0040053 A1 | 2/2008 | Plotnikov | |
| 2009/0166035 A1 | 7/2009 | Almaguer | |
| 2009/0195244 A1 | 8/2009 | Mouget et al. | |
| 2010/0207711 A1 | 8/2010 | Estes | |
| 2010/0308832 A1 | 12/2010 | Clark et al. | |
| 2011/0068797 A1 | 3/2011 | Hall et al. | |
| 2011/0163740 A1 | 7/2011 | Russell et al. | |
| 2012/0095686 A1 | 4/2012 | Legendre et al. | |
| 2015/0204648 A1 | 7/2015 | Nichols | |
| 2015/0219601 A1 | 8/2015 | Davydov et al. | |
| 2015/0285057 A1 | 10/2015 | Donderici et al. | |
| 2016/0061776 A1 | 3/2016 | Aslanyan et al. | |
| 2016/0070018 A1 | 3/2016 | Nichols et al. | |
| 2016/0168975 A1 | 6/2016 | Donderici et al. | |
| 2016/0178579 A1 | 6/2016 | Donderici et al. | |
| 2016/0187523 A1 | 6/2016 | Sanmartin et al. | |
| 2016/0245779 A1 | 8/2016 | Khalaj Amineh et al. | |
| 2016/0290122 A1 | 10/2016 | San Martin et al. | |
| 2016/0370166 A1 | 12/2016 | Yang et al. | |
| 2017/0168190 A1* | 6/2017 | Itskovich | G01V 3/28 |
| 2017/0362925 A1* | 12/2017 | Zhang | G01B 7/06 |
| 2018/0074221 A1* | 3/2018 | Reiderman | G01V 3/28 |

OTHER PUBLICATIONS

Arsalan A. Ansari et al.; *SPE-176655-MS Triple-Barrier Thickness Scanning Using Through-Tubing Pulse-Magnetic Logging Tool*; Society of Petroleum Engineers; Oct. 26-28, 2015; pp. 1-21.

Xue-long Wang et al.; *The Research on Pulsed Eddy Current in Non Destructive Testing for Metal Casing*; Journal of Convergence Information Technology; vol. 8, No. 3; Feb. 2013; pp. 1-7.

M.S. Safizadeh et al.; *Gas Pipeline Corrosion Mapping Using Pulsed Eddy Current Technique*; Advanced Design and Manufacturing Technology; vol. 5, No. 1; Dec. 2011.

Riaz-ud-Din Ahmed et al.; *SPE 156207 Effective and Eco Efficient Pipe Inspection in Heavy Mud Environment Using Induced Electro Magnetic Measurement (EMDS)*; Society of Petroleum Engineers Annual Technical Conference; Nov. 22-23, 2011; pp. 1-18.

Chao Sun et al.; *Application of MID-S Electromagnetic Flaw Detection Logging in Combination with Multi-arm Caliper Logging in Qinghai Oilfield*; PetroChina Qinghai Oilfield Testing Company et al.; 2013; pp. 1-6.

Vladimir Teplukhin et al. (Russian Petroleum Equipment Group); *Characteristics and Application Examples of New-generation EMDS-42 Type Electromagnetic Defectoscope*; World Well Logging Technology, Issue No. 5; May 2010; pp. 1-22.

Marvin Rourke et al.; *Multi-Tubular Corrosion Inspection Using a Pulsed Eddy Current Logging Tool*; International Petroleum Technology Conference—IPTC 16645; Mar. 2013; pp. 1-6.

Javier Garcia et al.; *Successful Application of a New Electromagnetic Corrosion Tool for Well Integrity Evaluation in Old Wells Completed with Reduced Diameter Tubular*; International Petroleum Technology Conference—IPTC. 16997 ; Mar. 2013; pp. 1-12.

K. Madsen et al.; *Methods for Non-Linear Least Squares Problems*; Informatics and Mathematical Modeling Technical University of Denmark; 2nd Edition, Apr. 2004; pp. 1-30.

Omar Alaref et al.; *Comprehensive Well Integrity Solutions in Challenging Environments Using Latest Technology Innovations*; Offshore Technology Conference Asia—OTC-26560-MS; Mar. 2016; pp. 1-9.

Riaz-ud-Din Ahmed et al.; *Effective and Eco-Efficient Pipe Inspection in Heavy Mud Environment Using Induced Electro Magnetic Measurement (EMDS)*; Feb. 2012; pp. 1-19.

A.A. Arbuzov et al.; *Memory Magnetic Imaging Defectoscopy*; Society of Petroleum Engineers Russian Oil & Gas Exploration & Production Technical Conference and Exhibition—SPE-162054; Oct. 2012; pp. 1-10.

A. Aslanyan et al.; *Time Domain Magnetic Defectoscopy for Tubing and Casing Corrosion Detection*; Society of Petroleum Engineers International Oilfield Corrosion and Exhibition Conference—SPE-169601-MS; May 2014; pp. 1-17.

Marvin Rourke et al.; *Algorithm Development and Case Study for a 1 11/16 "Pulsed Eddy Current Casing Inspection Tool*; Society of Petrophysicists and Well Log Analysts (SPWLA); SPWLA 55th Annual Logging Symposium; May 2014; pp. 1-12.

Andrey Arbuzov et al.; *Magnetic Imaging Defectoscope (MID-2M) White Paper*; TGT ; Aug. 2014; pp. 1-25.

Wikipedia; *Inverse Problem*; https://en.wikipedia.org/wiki/Inverse_problem; 2016; pp. 1-8.

* cited by examiner

PULSED EDDY CURRENT CASING INSPECTION TOOL

BACKGROUND OF THE INVENTION

1. Field of the Invention

This invention relates generally to downhole tools, and more particularly to downhole logging tools capable of casing inspection.

2. Description of the Related Art

A well casing is a metal pipe inserted into a borehole to provide mechanical support for the borehole and to enable the driller to control the types of subsurface fluids allowed to enter the borehole and the locations for such entries. Well casings are normally constructed of ferromagnetic steels. As such, they are subject to corrosion, mechanical damage due to impacts from downhole tools and even warpage resulting from stresses imparted by shifting borehole formations. Accordingly, determining the condition of well casings through inspection is an important part of well drilling and management.

Casing inspection based on pulsed eddy current excitation has been widely used for casing inspection in oil and gas industry for several years. Conventional techniques typically use a solenoid coil transmitter to generate a transient magnetic field and a solenoid receiver coil to sense induced eddy current magnetic fields. The transmitter is driven by a short, pulsed sine or square wave signal. The transient magnetic field excites eddy currents in the casing(s), which in-turn generate magnetic fields. When the driving signal is cut off, the eddy currents decay, producing a decaying electromagnetic signal that is sensed by the receiver coil. The attributes of the decaying signal are dependent on the geometrical and physical properties of the casing(s) and other factors, such as the properties of any cemented annulus. With proper modeling, attributes of the casing(s), such as inner and outer diameters (which can be compared to nominal values and thus indicated unwanted thinning) can be derived from the decaying signals.

Manufacturers have produced various conventional casing inspection tool designs over the years. The VNIIGIS Electromagnetic Defectoscope utilizes one short, concentric arrangement of a solenoid transmitter coil and a solenoid receiver coils and one long, as in longer than the shorter one, arrangement of a solenoid transmitter coil and a solenoid receiver coil. The short arrangement is longitudinally spaced from the long arrangement. There are a few lateral sondes positioned between the short and long arrangements. The long arrangement provides a greater depth of investigation, but at the cost of reduced vertical resolution. The short arrangement produces better vertical resolution than the long arrangement, but at the cost of depth of investigation. Finally, the combination of the long and short arrangements produces a relatively long tool. Long tools can be impacted by casing imperfections and hole slanting.

The present invention is directed to overcoming or reducing the effects of one or more of the foregoing disadvantages.

SUMMARY OF THE INVENTION

In accordance with one aspect of the present invention, a downhole logging tool for inspecting one or more well tubulars is provided. The downhole logging tool includes a housing adapted to be supported in the one or more well tubulars by a support cable. A first transmitter, a second transmitter and a third transmitter are positioned in longitudinally spaced-apart relation in the housing and are operable to generate magnetic fields. Driving circuitry is operatively coupled to the first transmitter, the second transmitter and the third transmitter to selectively fire the first transmitter, the second transmitter and the third transmitter in multiple transmission modes to generate magnetic fields to stimulate pulsed eddy currents in the one or more well tubulars. A first receiver is positioned in the housing to sense decaying magnetic fields created by the pulsed eddy currents. Electronic circuitry is operatively coupled to the first receiver to determine a parameter of interest of the one or more well tubular from the sensed decaying magnetic fields.

In accordance with another aspect of the present invention, a method of downhole logging a well having one or more well tubulars is provided. The method includes suspending a housing in the one or more well tubulars by a support cable. The housing includes a first transmitter, a second transmitter and a third transmitter positioned in longitudinally spaced-apart relation and operable to generate magnetic fields. The first transmitter, the second transmitter and the third transmitter are selectively fired in at least one of multiple possible transmission modes to generate magnetic fields to stimulate pulsed eddy currents in the one or more well tubulars. Decaying magnetic fields created by the pulsed eddy currents are sensed with a first receiver positioned in the housing. A parameter of interest of the one or more well tubulars is determined from the sensed decaying magnetic fields.

In accordance with another aspect of the present invention, a method manufacturing a downhole logging tool for inspecting one or more well tubulars is provided. The method includes fabricating a housing adapted to be supported in the one or more well tubulars by a support cable. A first transmitter, a second transmitter and a third transmitter are positioned in longitudinally spaced-apart relation in the housing. The first transmitter, the second transmitter and third transmitter are operable to generate magnetic fields. A first receiver is positioned in the housing to sense decaying magnetic fields created by the pulsed eddy currents. Driving circuitry is operatively coupled to the first transmitter, the second transmitter and the third transmitter to selectively fire the first transmitter, the second transmitter and the third transmitter in multiple transmission modes to generate magnetic fields to stimulate pulsed eddy currents in the one or more well tubulars.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
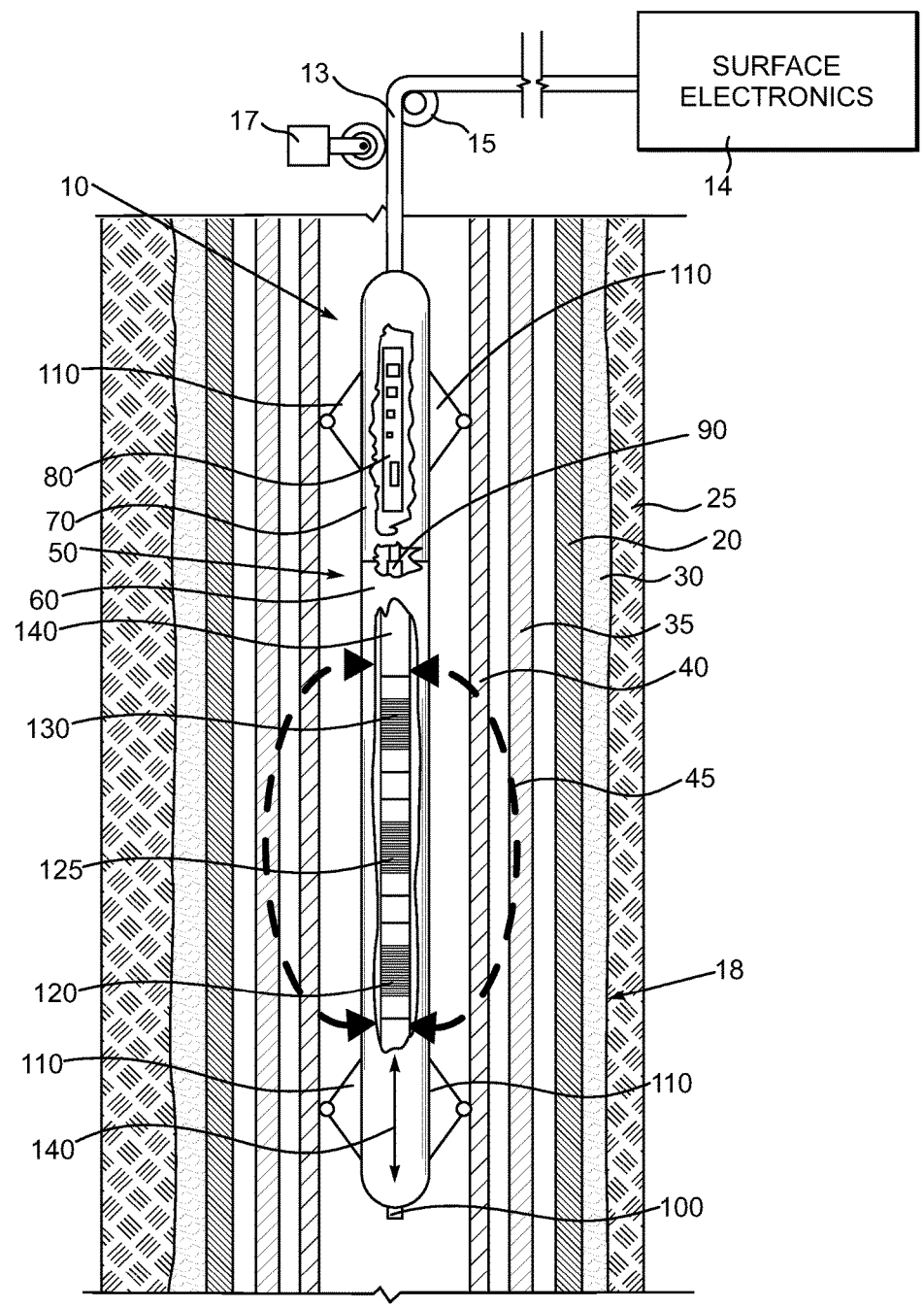
FIG. 1 is a schematic view of an exemplary embodiment of a downhole logging tool that may be used for well tubular inspection and other uses.

In the drawings described below, reference numerals are generally repeated where identical elements appear in more than one figure. Turning now to the drawings, and in particular to FIG. 1, therein is shown a schematic view of an exemplary embodiment of a downhole logging tool 10 that may be used for casing inspection and other uses. The downhole logging tool 10 is operatively coupled to a support cable 13, which may be a wireline or slickline. If configured as a wireline, the support cable 13 provides electrical connectivity and power between the downhole logging tool 10 and surface electronics 14, as well as mechanical suspension for the downhole logging tool 10. The support cable 13 is typically fed from a winch (not shown), passed around a pulley 15 and engages an odometer 17 or other type of distance measuring device. The odometer 17 tracks the penetration depth of the downhole logging tool 10. In the event that the support cable 13 is a slick line, then an optional power and data storage module or sonde (not shown) may be attached to the downhole logging tool 10. The surface electronics 14 may include power supply, data processing, telemetry, storage and virtually any other functions suitable for cable logging.

The downhole logging tool 10 may be lowered into a well 18 that includes one or more tubulars, which may be casings or other tubulars. In this illustrative embodiment, the well includes an outer tubular 20 that is separated laterally from a surrounding formation 25 by way of a cemented annulus 30, an intermediate tubular 35 inside the outer tubular 20 and an inner tubular 40 inside the intermediate tubular 35. As described in more detail below, the downhole logging tool 10 is operable to generate electromagnetic fields 45 to interrogate and determine properties of the tubulars 20, 35 and 40 through pulsed eddy current techniques.

The downhole logging tool 10 includes a sonde 50, which may include a sensor housing 60 and an electronics housing 70. The sensor housing 60 may enclose a variety of different types of sensors to be described in more detail below. The electronics housing 70 may enclose signal processing, power supply and other types of electronic circuitry. A portion of the electronics housing 70 is shown cut away to reveal a schematic depiction of the signal processing and power electronics 80. Optionally, the sensor housing 60 and the electronics housing 70 may be combined into a single housing if desired. The sensor housing 60 or more particularly the sensors disposed therein may be electronically and electrically connected to the electronics housing 70 by way of a suitable connector or connectors 90, which is shown in a cutaway portion at the junction of the sensor housing 60 and the electronics housing 70. The connector 90 may be any of a great variety of different types of downhole tool interface connectors, such as, for example, a 32-pin thread engagement connector or other. The electronics housing 70 may be connected to the sensor housing by way of a threaded coupling or other type of joint. The sensor housing 60 may connect to another sonde or components at its other end by way of another connector 100, which may be like the connector 90 or another type such as a single-pin wet stab connector or other. The sonde 50 may be centralized within the casing 20 by way of plural centralizers, four of which are visible and labeled 110. There may be centralizers 110 at each end of the sonde 50 and may number three or more and be of any configuration.

The sensor housing 60 encloses a variety of sensors. A portion of the sensor housing 60 is shown cut away to reveal that, for example, the sensor housing 60 may enclose transmitter/receiver modules 120, 125 and 130 positioned on or otherwise forming parts of a chassis 140. As described in more detail below, each of the transmitter/receiver modules 120, 125 and 130 may include a transmitter to generate interrogating electromagnetic fields to stimulate pulsed eddy currents in the tubulars 20, 35 and 40 and a receiver to sense the time varying pulsed eddy current electromagnetic fields propagating in the tubulars 20, 35 and 40. The transmitters of the transmitter/receiver modules 120, 125 and 130 may be a multi-turn solenoid coil that generates a magnetic dipole that is generally aligned with the long axis 140 of the sonde 50.

The sensor housing 60 and the electronics housing 70 are advantageously constructed of non-ferromagnetic materials in order to minimize interference with transmitted and received electromagnetic waves. Examples include various types of stainless steel, fiberglass, carbon composite or other synthetic materials or the like. The sensor housing 60 may be constructed of one or more sleeves of various materials connected end to end.

Figure 2:
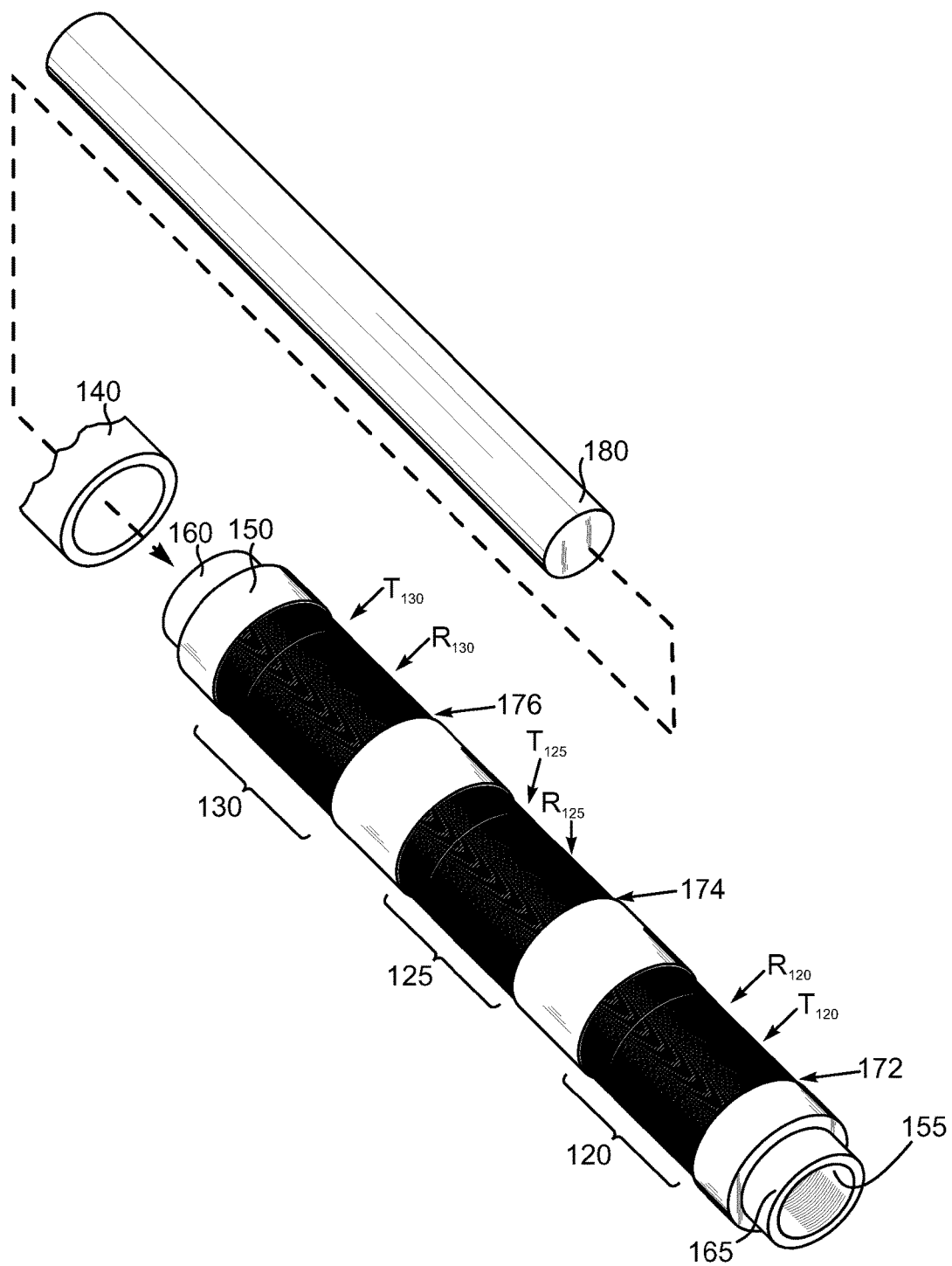
FIG. 2 is a partially exploded pictorial view of an exemplary embodiment of multiple transmitter/receiver modules.

Additional details of the transmitter/receiver modules 120, 125 and 130 may be understood by referring now to FIG. 2, which is a pictorial view of an exemplary embodiment of the transmitter/receiver module 125 with some components thereof and a portion of the chassis 140 exploded. The transmitter/receiver modules 120, 125 and 130 may be combined into a single, integrated insulating sleeve 150. The insulating sleeve 150 may include a central bore 155 that terminates at either end in nipples 160 and 165. The nipple 160 may connect to the portion of chassis 140. The opposite nipple 165 may connect to another section of the chassis 140 (not shown). These connections may be by screws or other fasteners (not shown). The insulating sleeve 150 may include longitudinally spaced necked down portions 172, 174 and 176. The transmitter/receiver module 120 may consist of a transmitter $T_{120}$ and a receiver $R_{120}$ co-located at the necked down portion 172. The transmitter/receiver module 125 may similarly consist of a $T_{125}$ and a receiver $R_{125}$ co-located at the necked down portion 174, and the transmitter/receiver module 130 may consist of a transmitter $T_{130}$ and a receiver co-located at the necked down portion 176. As described in more detail below, the transmitters $T_{120}$, $T_{125}$ and $T_{130}$ and the receivers $R_{120}$, $R_{125}$ and $R_{130}$ may be multi-turn coils. The transmitter/receiver modules 120, 125 and 130 may be air core, in which case the central bore 155 may be empty or may be provided with an electric magnetic enhancement core 180, which may be inserted into the bore 155. The electric magnetic enhancement core 180 may be constructed of ferrite, a laminate of rolled iron sheet or the like and may be single piece or segmented. The chassis 140 may be a tubular configuration as shown or other construction, and be constructed of a variety of materials such as stainless steel, low carbon steel, plastics or even other types of materials such as aluminum. The insulating sleeve 150 is advantageously constructed of electrically insulating materials such as, for example, PEEK, fiberglass, or other types of materials. The metallic components of the downhole logging tool 10 and any disclosed alternatives may be fabricated by forging, casting, machining, welding, combinations of these or others. The polymeric or otherwise synthetic components may be fabricated by molding, machining, welding combinations of these or others.

Figure 3:
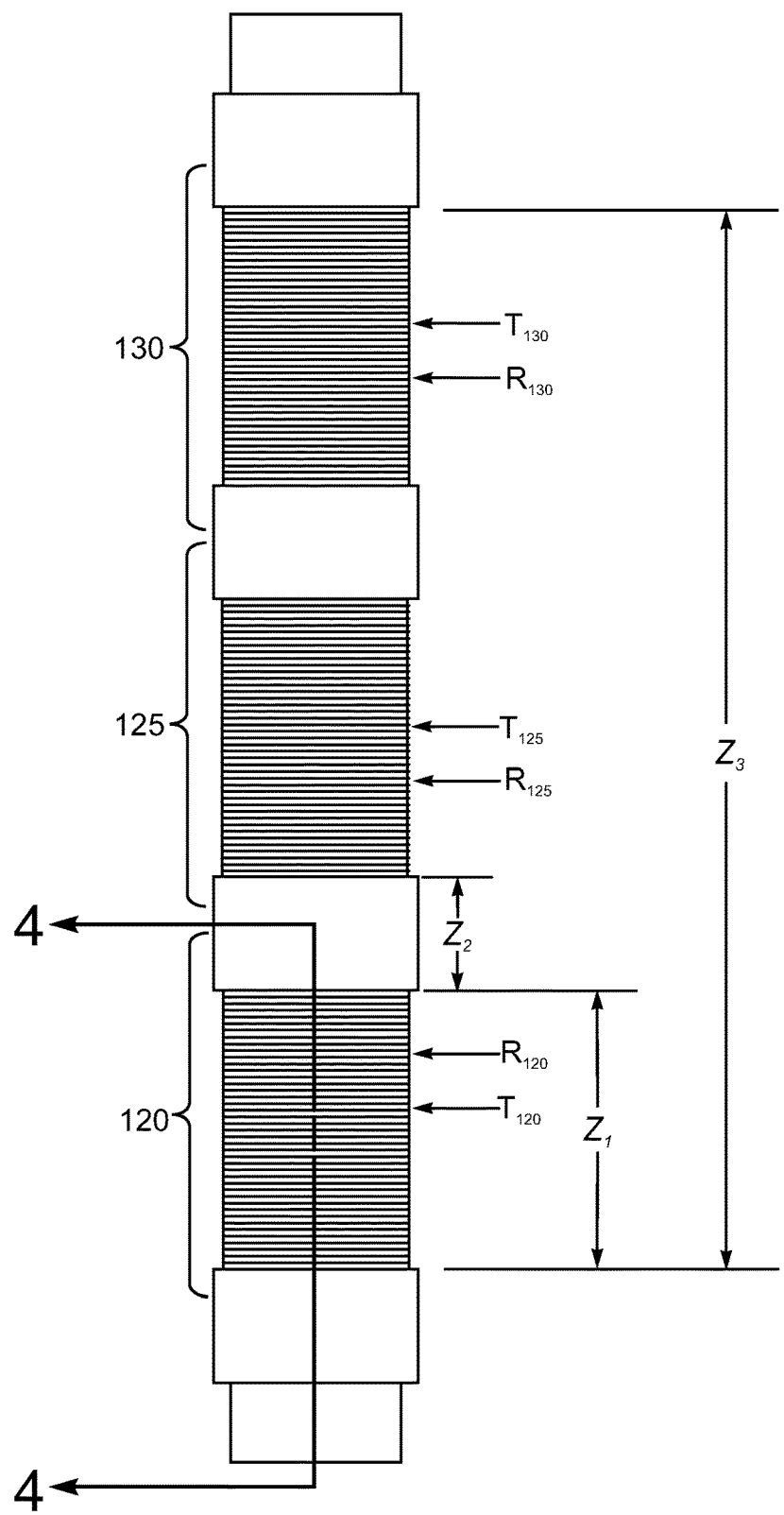
FIG. 3 is a side view of the exemplary multiple transmitter/receiver modules depicted in FIG. 2.

Additional details of the transmitter/receiver modules 120, 125 and 130 may be understood by referring now to FIG. 3, which is a side view. The transmitters $T_{120}$, $T_{125}$ and $T_{130}$ may be constructed with a length $Z_1$ and a longitudinal spacing $Z_2$. However, and as described in more detail below, the transmitters $T_{120}$, $T_{125}$ and $T_{130}$ may fired in different modes to achieve different depths of investigation and levels of lateral focusing. For example, by firing all three transmitters $T_{120}$, $T_{125}$ and $T_{130}$ simultaneously, the transmitters $T_{120}$, $T_{125}$ and $T_{130}$ can function like a single long transmitter with an equivalent length $Z_3$ and a correspondingly deeper depth of investigation. For example, $Z_1$ might be about 4 inches, $Z_2$ might be about 1 to 2 inches and $Z_3$ might be about 12 to 18 inches. These dimensions will depend on tool size, casing size and other factors. In another mode, one transmitter $T_{125}$, is fired and sensed for a relatively shallower depth of investigation. These different modes of firing and sensing are provided in a relatively longitudinally compact arrangement. The same principles apply to the other disclosed embodiments.

Figure 4:
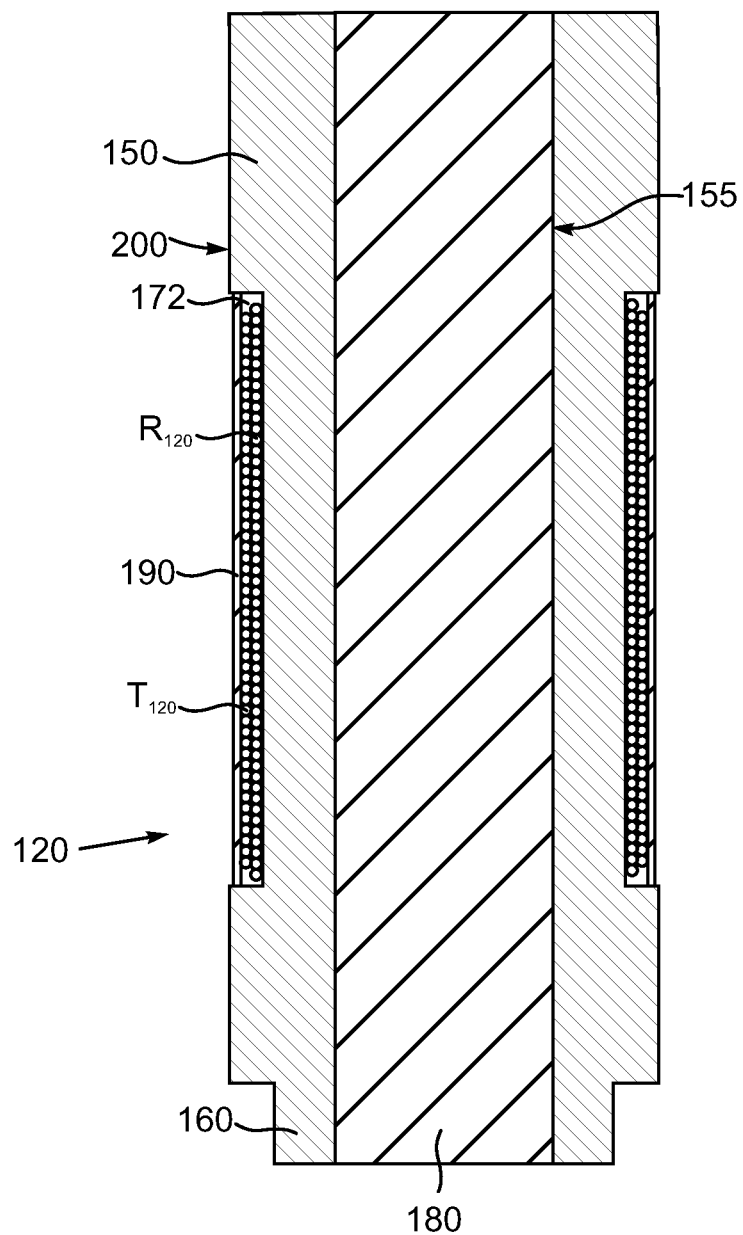
FIG. 4 is a sectional view of FIG. 3 taken at section 4-4.

Additional details of the transmitter/receiver module 120 may be understood by referring now also to FIG. 4, which is a sectional view of FIG. 3 taken at section 4-4. Note that because of the position of section 4-4, only the transmitter/receiver module 120 is shown in section and visible. The following discussion of the transmitter/receiver module 120 will be illustrative of the other transmitter/receiver modules 125 and 130. As noted above, the electromagnetic enhancement core 180 may be positioned in the internal bore 155 of the insulating sleeve 150. The receiver $R_{120}$ may be constructed from a multi-turn coil wound around the necked down portion 172 and a transmitter $T_{120}$ may be constructed of a multi-turn coil wound around and co-located with the receiver $R_{120}$. The receiver $R_{120}$ and the transmitter $T_{120}$ may be surrounded by an insulating sleeve 190 composed of mylar or other plastics. The receiver $R_{120}$ may be a single or multi-turn wire coil, or another type of magnetic field sensor or magnetometer, such as a flux gate magnetometer, a Hall Effect sensor, a giant magneto resistive sensor (GMR) or other. In this illustrative embodiment, the receiver $R_{120}$ may be a multi-turn wire coil wound around the necked down portion 172 of the insulating sleeve 150. The necked down portion 172 is sized so that the coils of the receiver $R_{120}$ do not project radially beyond the outer surface 200 of the insulating sleeve 150. In a wire embodiment for the receiver $R_{120}$, the composition, number of turns and gauge of the wire may be varied according to tool size, casing properties and other factors. In an exemplary embodiment the receiver $R_{120}$ consists of approximately 2,000 turns of insulated 40 gauge magnet wire.

The transmitter $T_{120}$ may be a multi-turn solenoid coil. The composition, number of turns and gauge of the wire used for the transmitter $T_{120}$ may be varied according to tool size, casing properties and other factors. In an exemplary embodiment, the transmitter $T_{120}$ may include approximately 2,000 turns of insulated 32 gauge magnet wire. The leads of the receiver $R_{120}$ and the leads of the transmitter $T_{120}$ (not shown) may be routed longitudinally along the insulating sleeve 150 using slots (not shown) or otherwise.

Figure 5:
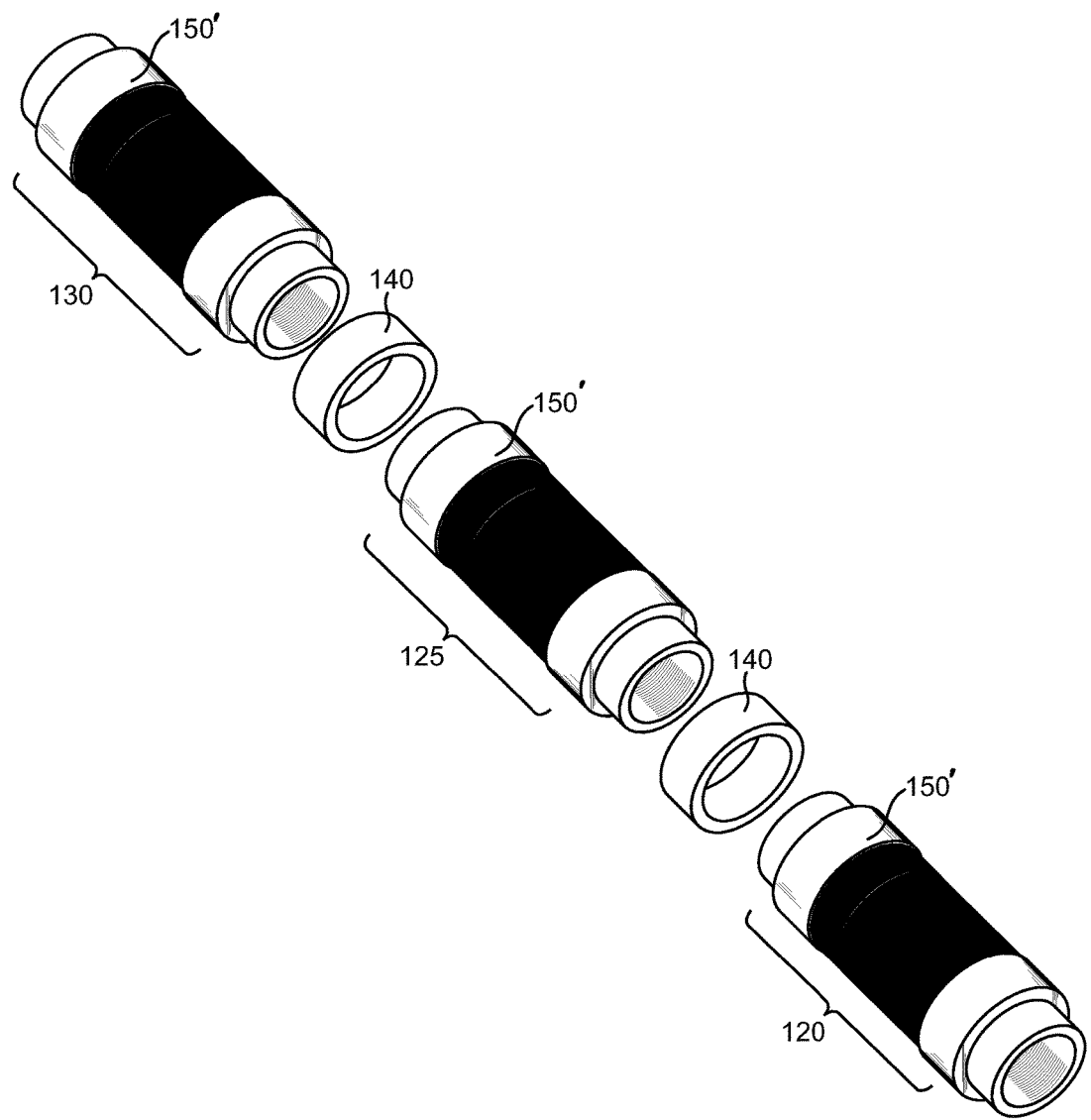
FIG. 5 is a partially exploded pictorial view of another alternate exemplary embodiment of multiple transmitter/receiver modules.

In some of the disclosed embodiments, the transmitter/receiver modules 120, 125 and 130 are positioned on an integrated sleeve 150. However, as shown in FIG. 5, the transmitter/receiver modules 120, 125 and 130 may each be mounted on individual insulating sleeves 150' that are then joined together by chassis portions 140. This more modular arrangement may make maintenance easier in the event one of the transmitter/receiver modules, say module 125 fails, while the other modules 120 and 130 still function. In that instance, only the failing module 120 need be swapped out.

Figure 6:
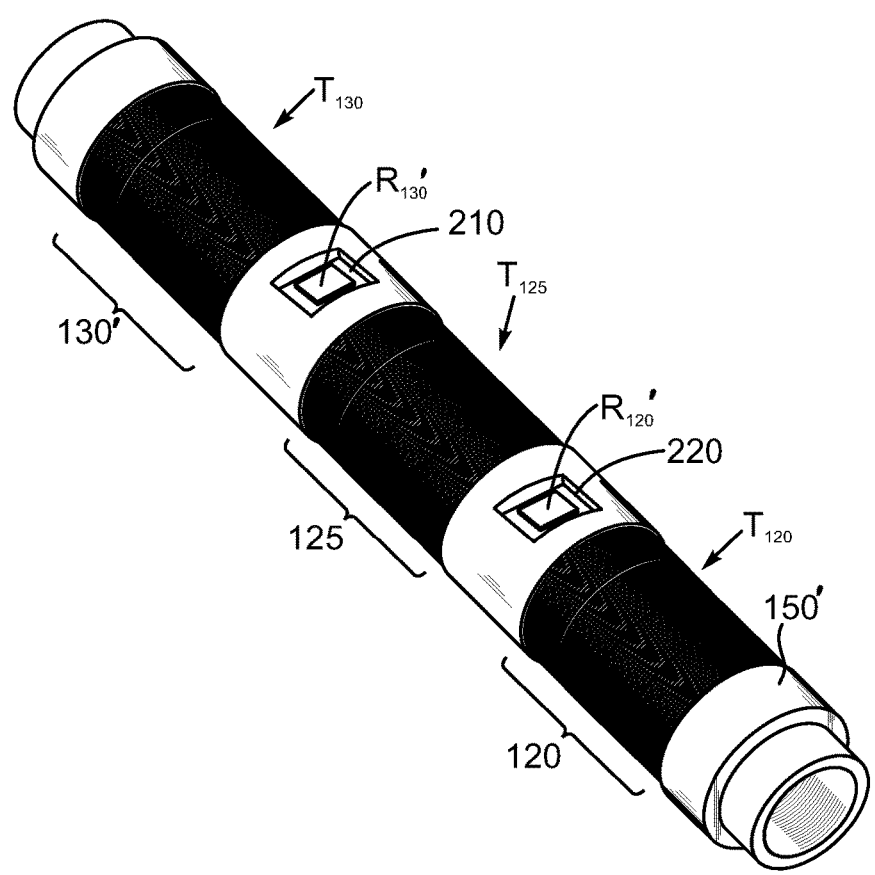
FIG. 6 is a pictorial view of another alternate exemplary embodiment of multiple transmitter/receiver modules.

As noted above, the receivers $R_{120}$, $R_{125}$ and $R_{130}$ may be other than a solenoid coil. In this regard, attention is now turned to FIG. 6, which is a pictorial view. Here, the insulating sleeve 150' is fitted with the transmitters $T_{120}$, $T_{125}$ and $T_{130}$ and described above in conjunction with FIGS. 2, 3, and 4. However, two receivers $R_{120}'$ and $R_{130}'$ may be configured as flux gate magnetometers, Hall Effect sensors, GMR sensors or other types of magnetic sensor or magnetometers. The receivers $R_{120}'$ and $R_{130}'$ may be positioned in suitable spaces 210 and 220, respectively, formed in the insulating sleeve 150' using well-known techniques. Again, the selective grouping of transmitters $T_{120}$, $T_{125}$ and $T_{130}$ for firing purposes to achieve different depths of investigation in a compact design may be achieved as discussed above.

Figure 7:
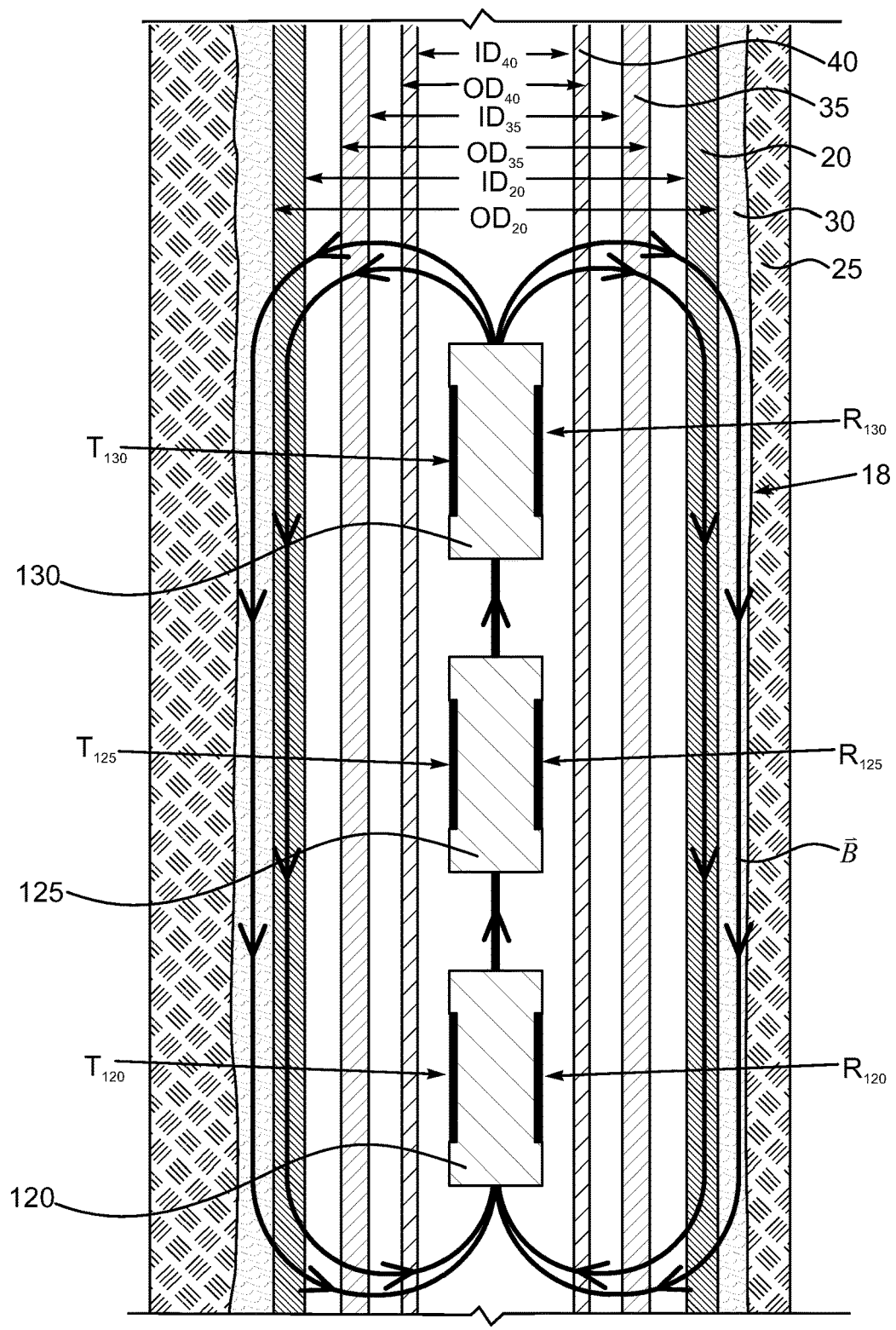
FIG. 7 is a schematic representation of multiple transmitter/receiver modules in a first exemplary transmitter transmission mode.

Some exemplary parameters of interest and transmitter firing and receiver reception modes may be understood by referring now to FIGS. 7, 8, 9, 10 and 11 and initially to FIG. 7, which is a sectional view of the well 18 and the tubulars 20, 35 and 40, as well as the cemented annulus 30 and the formation 25. Here, the transmitter/receiver modules 120, 125 and 130 are schematically depicted, and for simplicity of illustration, by themselves and without the other components of the downhole tool 10 depicted in FIG. 1. It is desirable to fire the transmitters of the transmitter/receiver modules 120, 125 and 130 and receive pulsed eddy current induced responses in a variety of modes in order to interrogate the tubulars 20, 35 and 40 to obtain various parameters of interest such as, the outer diameter $OD_{20}$ of the tubular 20, the inner diameter $ID_{20}$ of the tubular 20, the outer diameter $OD_{35}$ of the tubular 35 the inner diameter $ID_{35}$ of the tubular 35, the outer diameter $OD_{40}$ of the tubular 40 and the inner diameter $ID_{40}$ of the tubular 40 all as correlated to various depths in the well 18. Thus, for example, the thickness $t_{20}$ of the tubular wall 20 at any particular depth may be given by $OD_{20}-ID_{20}$ and this thickness $t_{20}$ will typically be an average thickness for the tubular 20 at that depth. The same is true for the other thicknesses $t_{35}$ and $t_{40}$ that may be determined and correlated to depth for the tubulars 35 and 40. Since the EMF signals received by the receivers $R_{120}$, $R_{125}$ and $R_{130}$ of the transmitter/receiver modules 120, 125 and 130 are responsive not only to the casing geometry but also to the electrical properties of the tubulars 20, 35 and 40, the electrical properties, that is, the conductivity, etc. for the tubulars 20, 35 and 40 may also be derived from the received signals. The following table lists some exemplary transmitter firing and receiver reception modes.

TABLE

| Mode (n) | Transmitter Firing Mode | Transmitter Signal Phase | Reception Mode | Received Signal(s) $E_n(t)$ |
|---|---|---|---|---|
| 1 | Transmitters $T_{120}$, $T_{125}$ and $T_{130}$ simultaneous | $\Phi$ | mid-receiver $R_{125}$ only | E125(t) |
| 2 | Transmitters $T_{120}$, $T_{125}$ and $T_{130}$ simultaneous | $\Phi$ | all three receivers $R_{120}$, $R_{125}$ and $R_{130}$ | E120(t) + E125(t) + E130(t) |
| 3 | Transmitters $T_{120}$, $T_{125}$ and $T_{130}$ simultaneous | $\Phi$ | differential: $R_{130}$-$R_{120}$ | E130(t) − E120(t) |
| 4 | Transmitters $T_{120}$, $T_{125}$ and $T_{130}$ simultaneous | Transmitters $T_{120}$ and $T_{130}$ at phase $\Phi$ but transmitter $T_{125}$ at phase $\Phi$-180° | mid-receiver $R_{125}$ only | E125(t) |
| 5 | Transmitter $T_{125}$ only | $\Phi$ | mid-receiver $R_{125}$ only | E125(t) |

In a first exemplary mode, Mode 1, all three transmitters $T_{120}$, $T_{125}$ and $T_{130}$ may be fired simultaneously with the same phase $\Phi$ and sensed with the mid-receiver $R_{125}$ only. The received signal $E_1(t)$ for Mode 1 is E125(t) where the number "125" denotes the receiver number. The magnetic field $\vec{B}$ generated by the combined firing of the transmitters $T_{120}$, $T_{125}$ and $T_{130}$ is equivalent to a long sensor/transmitter firing that would be present in a traditional pulsed eddy current casing inspection tool. The magnetic field $\vec{B}$ generated by the combined firings of transmitters $T_{120}$, $T_{125}$ and $T_{130}$ propagates a significant distance in both the longitudinal and lateral directions. Therefore, a multiple casing string, such as a string that includes all three tubulars 40, 35 and 20, can react to the generated field $\vec{B}$ and the induced magnetic response of the tubulars 40, 35 and 20 can be detected by the aforementioned combination of receivers. The signal that is received from receiver $R_{125}$ alone will be responsive to the excitation of the far tubular 20, and since the receiver $R_{125}$ is typically much shorter than the long receiver used in a conventional pulsed eddy current arrangement, the vertical resolution associated with the signal at receiver $R_{125}$ should be higher than for the conventional tool as well. Exemplary transmitter pulse widths may be about 10 to 150 milliseconds and exemplary firing intervals may be about 0.5 to 1.25 seconds. These values may be varied.

Figure 8:
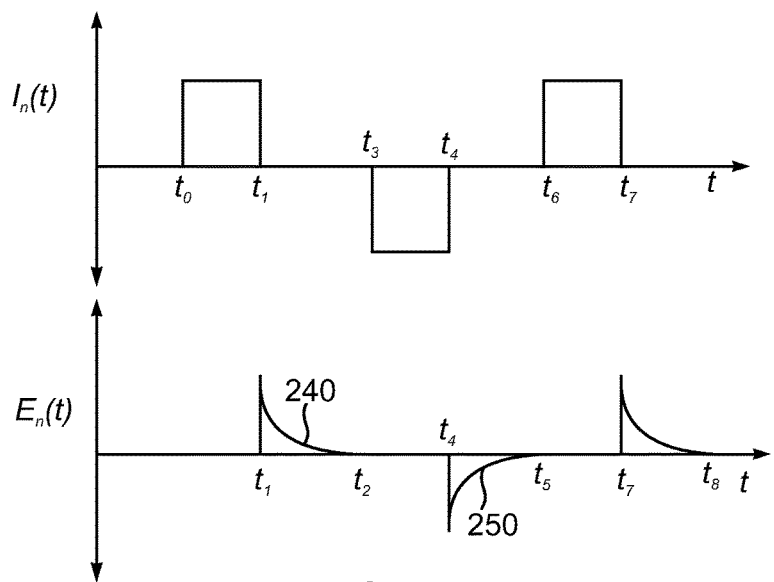
FIG. 8 depicts exemplary plots of transmitter driving current and received decaying pulsed eddy current induced magnetic signals.
Figure 9:
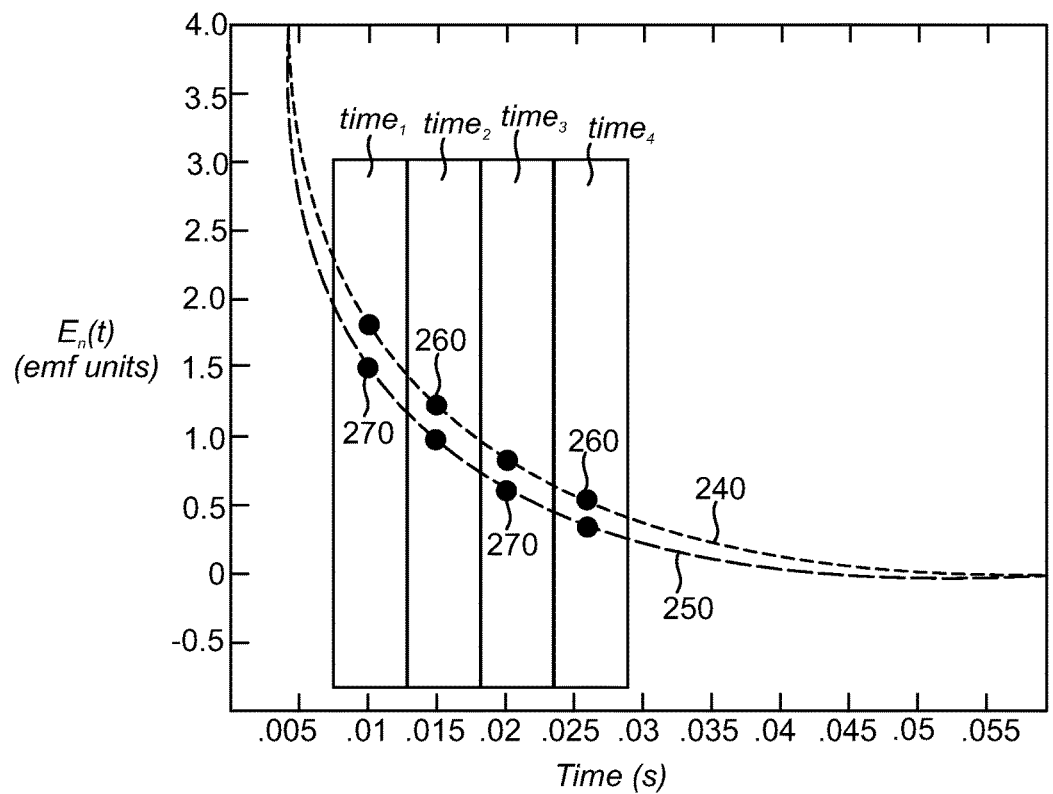
FIG. 9 depicts the exemplary decaying pulsed eddy current induced magnetic signals at more detail.

The signal transmission and reception may be understood by referring now also to FIG. 8, which is a timing diagram of transmitter drive signals and receiver reception signals, and to FIG. 9, which depicts plots of receiver signals versus time. The top plot of FIG. 8 is the transmitter driving signal $I_n(t)$ where the subscript n denotes the transmitter firing and receiver reception mode number. The lower plot is a plot of the sensed signal $E_n(t)$ where again the subscript n denotes the transmitter firing and receiver reception mode number shown in the table above. Assume for the purposes of this discussion that the transmitters $T_{120}$, $T_{125}$ and $T_{130}$ are simultaneously driven with a signal $I_n(t)$ from time $t_0$ to $t_1$. In this illustrative embodiment a square wave form may be used for the driving signal but other wave forms, such as sine, saw tooth or other wave forms may be used. At time $t_1$, the driving signal is stopped and the receiver $R_{125}$ picks up an electromotive force signal that is $E_n(t)$. The signal $E_n(t)$, represented by the plot 240 in FIGS. 8 and 9, decays over some time interval $t_2$-$t_1$. The vertical axis in FIG. 9 may be in emf units, which may be volts, millivolts or some other appropriate units. Next from period $t_3$ to $t_4$ the transmitter driving signal $I_n(t)$ is again generated and at time $t_4$ terminated at which point the received signal $E_n(t)$ decays from $t_4$ to $t_5$. The absolute value of that plot 250 from FIG. 8 is shown and also labeled 250 in FIG. 9. Again it is assumed just for the purposes of illustration that the received signals for plots 240 and 250 differ by what is shown in FIG. 9. The plots 240 and 250 represent analog signals that may be interpreted to infer particular properties of the tubulars 20, 35 and 40, such as thickness and other properties. This interpretation process will be described in more detail below. The plots 240 and 250 of $E_n(t)$ may be sliced into a number of time windows $time_1$, $time_2$, $time_3$ and $time_4$ and data points 260 and 270 taken from each. Here, for simplicity of illustration, only four time windows $time_1$, $time_2$, $time_3$ and $time_4$ are depicted, however the number may be much, much larger as desired. The response $E_n(t)$ in each window $time_1$, $time_2$, $time_3$ and $time_4$ has characteristics closely related to the physical geometry and parameters. In any event, and as described below, the data points 260 and 270 may be used with inversion techniques to generate one or more models to yield values for casing properties based on the data points 260 and 270. It should be understood that a particular data set, such as the plot or the sampled data points 260 and 270 may be generated every time one or more of the transmitters is fired and eddy current signals are generated and received and in the various modes, Mode 1 to Mode 5. For example, FIG. 9 might depict plots of $E_3(t)$ (i.e., Mode 3) in order to yield a differential signal for each instance of transmitter firing.

In a second exemplary mode, Mode 2, all three transmitters $T_{120}$, $T_{125}$ and $T_{130}$ may be fired simultaneously with the same phase $\Phi$ and sensed with all the receivers $R_{120}$, $R_{125}$ and $R_{130}$ where those signals E120(t)+E125(t)+E130(t) are added to yield $E_2(t)$. Data sets, such as those depicted in FIG. 9, may be generated. Thus, the plot 240 might be a data set for added signals E120(t)+E125(t)+E130(t) at time interval $t_2$-$t_1$ and the plot 250 might be a data set for added signals E120(t)+E125(t)+E130(t) at time interval $t_5$-$t_4$ and so on.

In a third exemplary mode, Mode 3, all three transmitters $T_{120}$, $T_{125}$ and $T_{130}$ may be fired simultaneously with the same phase $\Phi$ and a differential signal E130(t)−E120(t) may be sensed to yield $E_3(t)$. Data sets, such as those depicted in FIG. 9, may be generated. Thus, the plot 240 might be a data set for a time interval $t_2$-$t_1$ and the plot 250 might be a data set for differential signal E130(t) E120(t) at time interval $t_5$-$t_4$ and so on. The combination of the received signals $E_{120}(t)+E_{125}(t)+E_{130}(t)$ in Mode 2 will be equivalent to the conventional long receiver signal and will be useful for interpretation. The differential signal E130(t)−E120(t) in Mode 3 will reflect local variations between the receivers $R_{130}$ and $R_{120}$ with good resolution. Note that the ghosting effect in Mode 3 will have to be removed later since a local defect will appear twice as the transmitter/receiver modules 120, 125 and 130 pass through a given section of the well 18. Exemplary transmitter pulse widths may be about 10 to 150 milliseconds and exemplary firing intervals may be about 0.5 to 1.25 seconds. These values may be varied.

Figure 10:
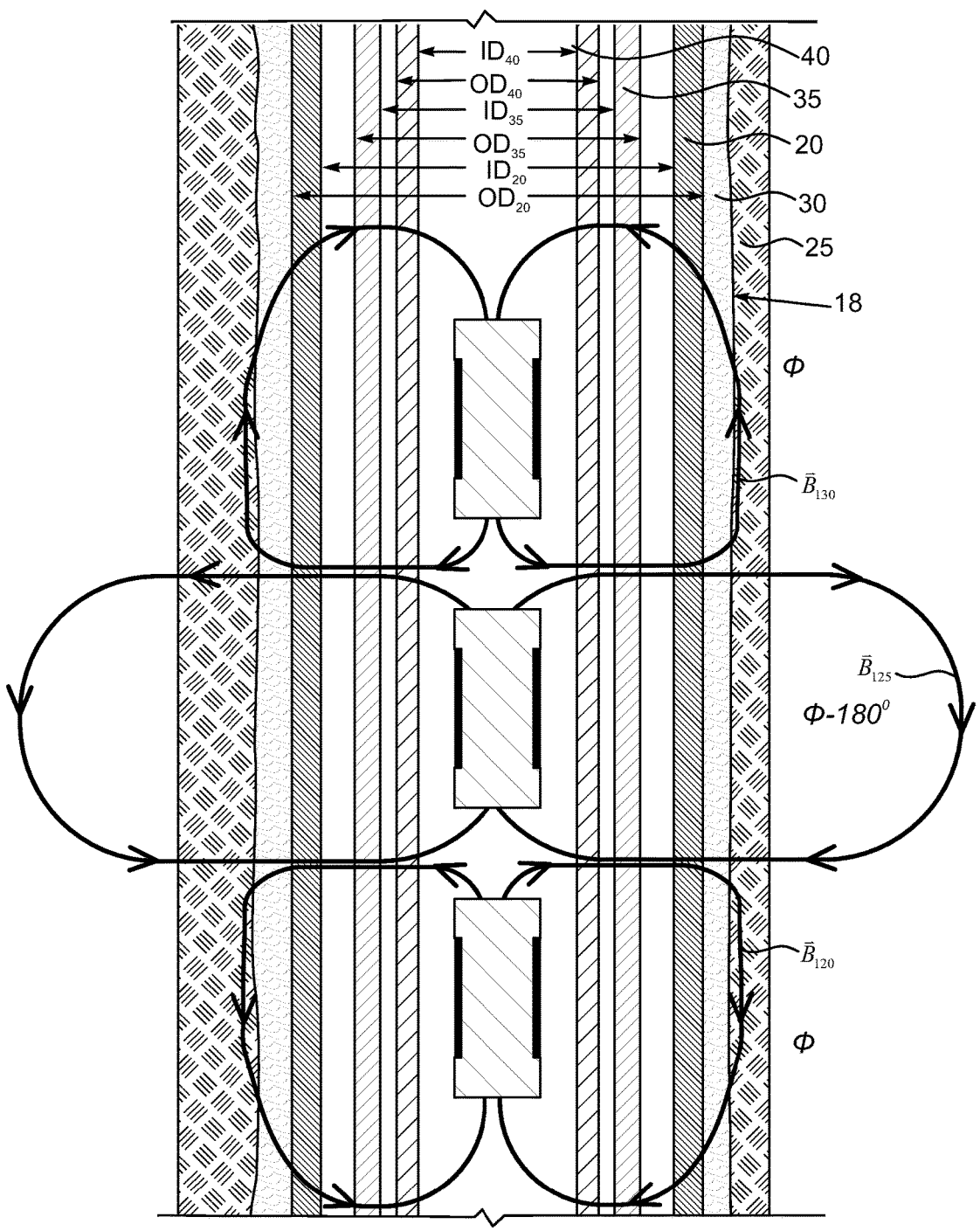
FIG. 10 is a schematic representation of multiple transmitter/receiver modules in a second exemplary transmitter transmission mode.

A different transmission/reception mode, Mode 4, may be understood by referring now to FIG. 10, which is a sectional view of the well 18 and the tubulars 20, 35 and 40, as well as the cemented annulus 30 and the formation 25. Here, the transmitters $T_{120}$ and $T_{130}$ may be simultaneously fired, each at some phase Φ, while the transmitter $T_{125}$ may be fired at the same time but at a shifted phase Φ−180. The resulting pulsed eddy current signals returning from the tubulars 20, 35 and 40 may be sensed by the receiver $R_{125}$. By firing transmitters $T_{120}$ and $T_{130}$ 180° out of phase with the transmitter $T_{125}$, the electromagnetic fields $\vec{B}_{120}$ and $\vec{B}_{130}$ from transmitters $T_{120}$ and $T_{130}$ essentially act against the field $\vec{B}_{125}$ associated with transmitter $T_{125}$ and by what amounts to a super position phenomena push the magnetic field $\vec{B}_{125}$ a greater distance laterally to achieve an improved lateral focusing. In this way, the farthest tubular 20 can be excited but in a somewhat constrained vertical domain and thus somewhat localized around the position of the transmitter $T_{125}$. Again the reception modes can be by way of receiver $R_{125}$ only for signal E125(t) or by the simultaneous reception by receivers $R_{120}$, $R_{125}$ and $R_{130}$ where the signal is given by E120(t)+E125(t)+E130(t) or by a differential signal E130(t)−E120(t) for $R_{130}$−$R_{120}$. If receiver $R_{125}$ only is used, the vertical resolution is boosted due to the aforementioned lateral push of the magnetic field $\vec{B}_{125}$. This particular transmitter firing and reception mode solves a significant technical issue associated with traditional pulsed eddy current tool designs where the depth of investigation and the vertical resolution have to be compromised. The reception mode $R_{120}$+$R_{125}$+$R_{130}$ helps to increase the signal to noise ratio by interrogating a broader area and again the differential signal $R_{130}$−$R_{120}$ is responsive to local defects. The same types of data sets depicted in FIG. 9 and described above may be generated. Although the dimensions $OD_{20}$, $ID_{20}$ may be particularly targeted by the measurements, the other dimensions $OD_{35}$, $ID_{35}$, $OD_{40}$ and $ID_{40}$ and properties could be interpreted from the measurements as well. Exemplary transmitter pulse widths may be about 10 to 150 milliseconds and exemplary firing intervals may be about 0.5 to 1.25 seconds. These values may be varied.

Figure 11:
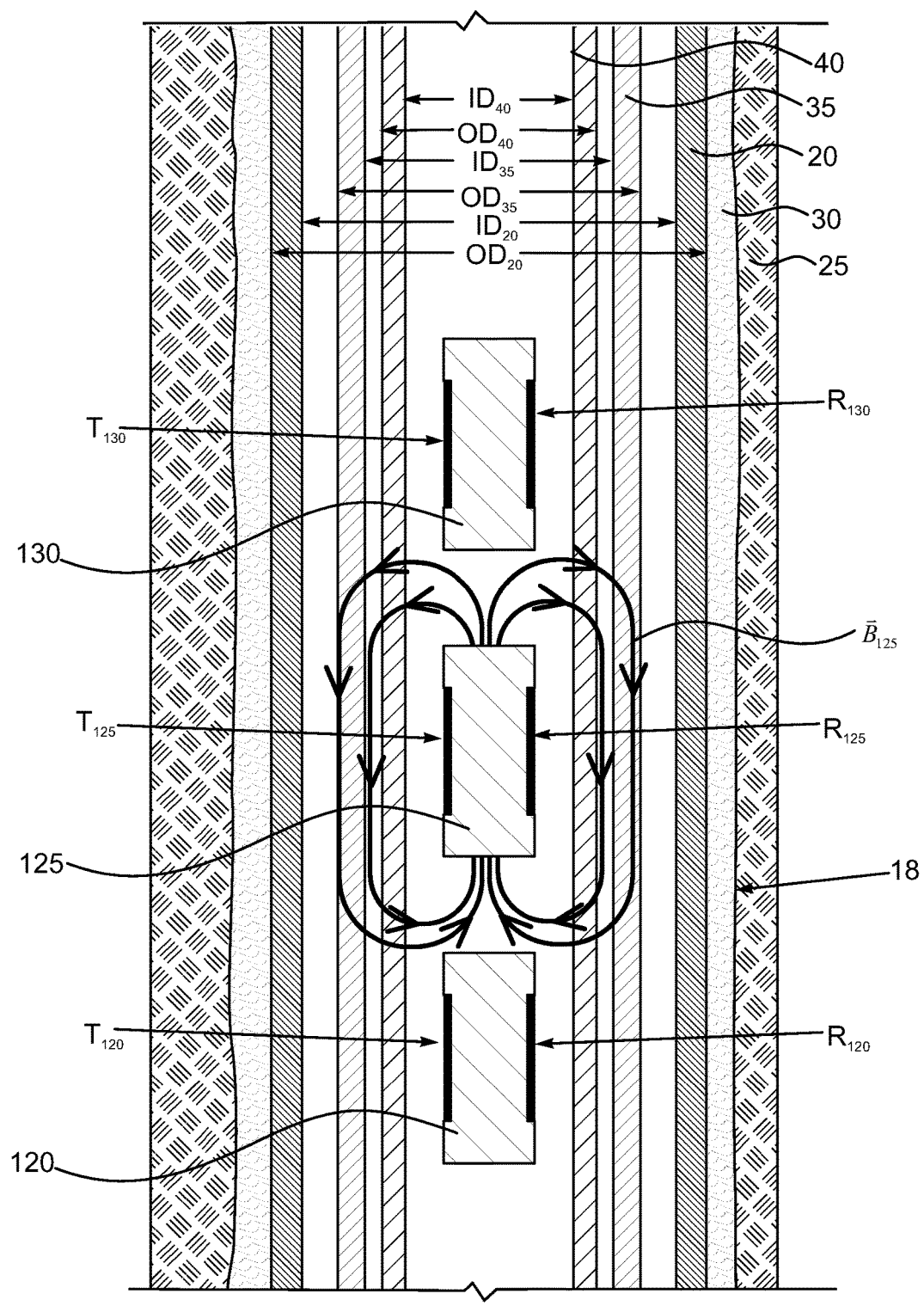
FIG. 11 is a schematic representation of multiple transmitter/receiver modules in a third exemplary transmitter transmission mode.

Another transmission/reception mode, Mode 5, may be understood by referring now to FIG. 11, which is a sectional view of the well 18 and the tubulars 20, 35 and 40, as well as the cemented annulus 30 and the formation 25. Here, only the transmitter $T_{125}$ is fired to generate a magnetic field $\vec{B}_{125}$, and the induced signal E125(t) (i.e., $E_5$(t)) is received by the receiver $R_{125}$ only. The tool response will be equivalent to a typical short sensor in a traditional pulsed eddy current tool. This transmitter/receiver mode may be used mainly for detecting the properties of the innermost tubular 40 or in the case of a single casing or double casing tool whichever is the tubular that is closest to the tool. However, the other reception modes include combined receivers $R_{120}$+$R_{125}$+$R_{130}$ and differential using receivers $R_{130}$ and $R_{120}$. It may be possible to only use transmitters $T_{120}$ and $T_{130}$ and it may be advantageous to make those transmitter/receiver modules 120 and 130 with air cores in order to avoid distortions associated with the presence of iron near the receiver $R_{125}$. The same types of data sets depicted in FIG. 9 and described above may be generated. Although the dimensions $OD_{40}$, $ID_{40}$ may be particularly targeted by the measurements, the other dimensions $OD_{35}$, $ID_{35}$, $OD_{20}$ and $ID_{20}$ and properties could be interpreted from the measurements as well. Exemplary transmitter pulse widths may be about 10 to 150 milliseconds and exemplary firing intervals may be about 0.5 to 1.25 seconds. These values may be varied. By combining all measurements for such multiple modes, the tool 10 can provide multiple depths of investigation and multiple resolutions beneficial to the interpretation.

Figure 12:
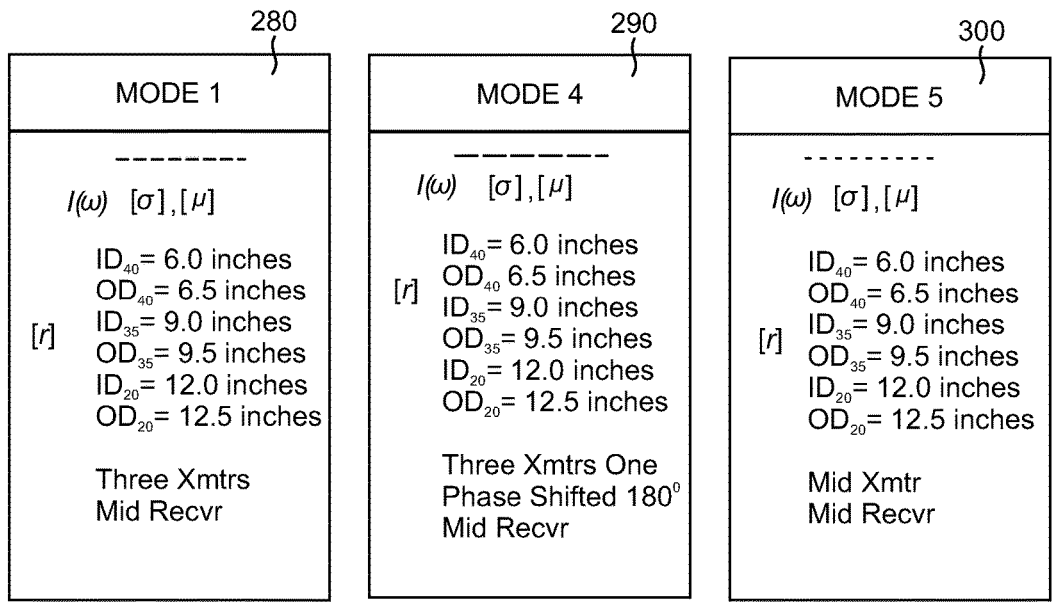
FIG. 12 depicts exemplary data sets and transmission modes for forward modeling tool response and exemplary plots of the modeled decaying pulsed eddy current induced magnetic signals.
Figure 12:
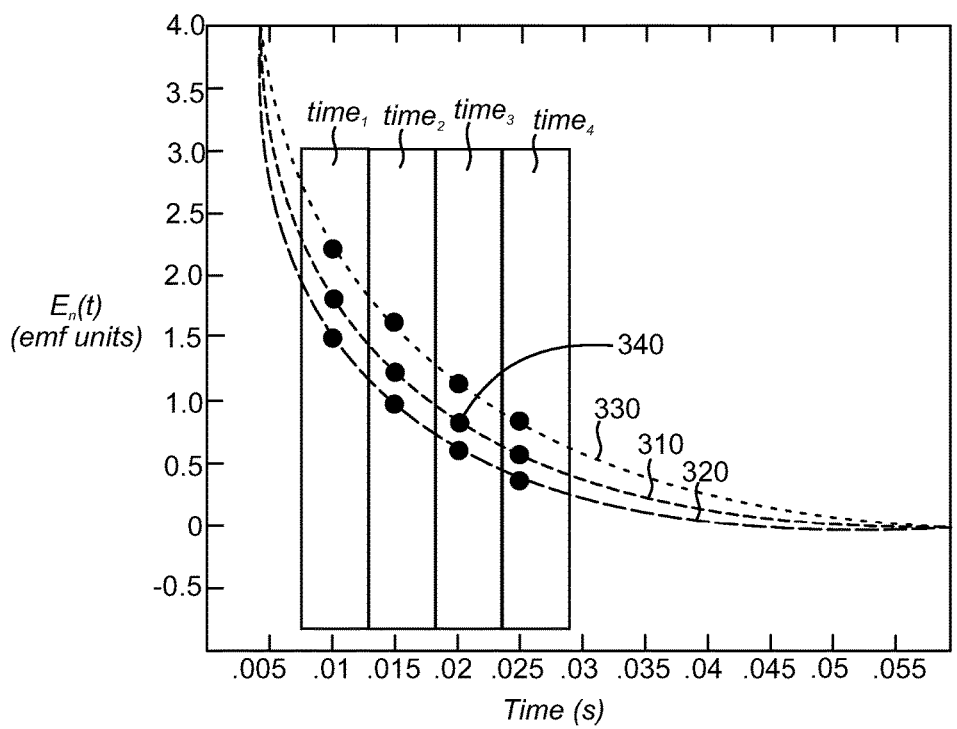

As noted above in the discussion of FIG. 9, actual measured tool responses $E_n$(t), e.g., the data points 260 or 270, can be interpreted to correspond to various physical parameters of the tubulars 20, 35 and 40. Here again, the subscript n denotes the transmitter firing and receiver reception mode number. In this way, tubular thickness (or tubular thinning if that is the case) and other parameters can be inferred from the measurements of $E_n$(t). However, the response of the tool 10 must first be forward modeled and thereafter inversion techniques used to match actual $E_n$(t) measurements to the best model. The forward modeling process will now be described. The tool response in terms of $E_n$(t) can be derived from:

$$E_n(t) = C \int_{-\infty}^{\infty} f(I(\omega), [r], [\sigma], [\mu]) e^{i\omega t} d\omega \tag{1}$$

where C is a constant for the particular tool configuration, I(ω) is the input electrical current to a transmitter in the frequency domain, [r] represents the radii of all the interfaces in the tubulars, and [σ] and [μ] represent the electromagnetic parameters of all the media layers. For example, and assuming forwarding modeling of all the tubulars 20, 25 and 40, [r] represents the grouping of the outer radius (i.e., $OD_{20}$/2), of tubular 20 the inner radius (i.e., $ID_{20}$/2) of the tubular 20 the outer radius (i.e., $OD_{35}$/2) of tubular 35, the inner radius (i.e., $ID_{35}$/2) of the tubular 35 and so on for the other tubular 40. Similarly, [σ] and [μ] represent the groupings of conductivity and magnetic permeability of the media, such as the tubulars 20, 25 and 40, and cement or other media. The quantity ω is the driving frequency, t is time and i=$\sqrt{-1}$. With these known quantities I(ω), [r], [σ] and [μ] in hand, the receiver signal $E_n$(t) from Equation (1) for various configurations of (1) tubular composition; (2) tubular thickness; (3) tubular composition; (4) media properties; and (5) transmitter firing and receiver reception modes can be determined (or forward modeled) using well-known numerical methods or even numerical simulations. Commercial software programs, such as Comsol Multiphysics or others, may be used to perform the simulations. To perform inversion, that is, determine the desired physical parameters of the tubulars 20, 35 and 40 from actual measurements of tool response $E_n$(t), an initial configuration set up is assumed with the known quantity I(ω) and initial guesses of the quantities [r], [σ] and [μ] in hand. Next, forward modeling is performed on Equation (1) to calculate the expected/estimated receiver responses $E_n$(t). For example, FIG. 12 depicts three exemplary parameter sets 280, 290 and 300 for forward modeling some of the possible transmitter firing and receiver reception modes, Mode 1, Mode 4 and Mode 5. Plot 310 depicts the calculated expected receiver response $E_{nmodeled}$(t) for the known quantity I(ω) and the initial guesses of [r], [σ] and [μ] and transmitter firing and receiver reception Mode 1, i.e., the pairing of three transmitters $T_{120}$, $T_{125}$ and $T_{130}$ and one receiver $R_{125}$. Plot 320 depicts the calculated receiver response $E_{nmodeled}$(t) for the known quantity I(ω) and the initial guesses of [r], [σ] and [μ] and another transmitter firing and receiver reception Mode 4, i.e., the pairing of transmitters $T_{120}$, $T_{125}$ and $T_{130}$ with 180° phase shifted output and the receiver $R_{125}$ shown in FIG. 10. Plot 330 depicts the calculated receiver response $E_{nmodeled}(t)$ for the known quantity $I(\omega)$ and the initial guesses of $[r]$, $[\sigma]$ and $[\mu]$ and another transmitter firing and receiver reception mode, Mode 5, i.e., the pairing of the transmitter $T_{125}$ and receiver $R_{125}$ shown in FIG. 11. Note that the values for tubular geometry, such as $ID_{40}$, $OD_{20}$ etc., in FIG. 12 are hypothetical. The plots 310, 320 and 330 and of $E_{nmodeled}(t)$ may be sliced into a number of time windows $time_1$, $time_2$, $time_3$ and $time_4$ and data points 375 taken from each. Here, for simplicity of illustration, only four time windows $time_1$, $time_2$, $time_3$ and $time_4$ are depicted, however the number may be much, much larger as desired. The response $E_{nmodeled}(t)$ in each window $time_1$, $time_2$, $time_3$ and $time_4$ has characteristics closely related to the physical geometry and parameters. Next, actual tool measurements (such as those shown in FIG. 9) are compared to the calculated tool responses $E_{nmodeled}(t)$ (i.e., the plot 360 or at least the data points 340 thereof), and through an iterative process, the forward modeling input parameters are adjusted until the differences are within tolerances or in other words, at some minimum desired values (Min) according to:

$$\text{Min} \left\{ \left\| \begin{bmatrix} E_{nmodeled}(time_1) \\ E_{nmodeled}(time_2) \\ E_{nmodeled}(time_3) \\ E_{nmodeled}(time_4) \end{bmatrix} - \begin{bmatrix} E_{measured}(time_1, [r], [\sigma], [\mu]) \\ E_{measured}(time_2, [r], [\sigma], [\mu]) \\ E_{measured}(time_3, [r], [\sigma], [\mu]) \\ E_{measured}(time_4, [r], [\sigma], [\mu]) \end{bmatrix} \right\|^2 \right\} \quad (2)$$

where $E_{nmodeled}$ is the modeled response and $E_{Measured}$ (which is also denoted $E_n(t)$ in FIG. 9) is the measured response. It is anticipated that modeled functions will be non-linear. Therefore, well known Gauss-Newton, Levenberg-Marquardt or other iterative techniques could be used. After such match is achieved, the final input parameters are the inversion results. The iteration process is actually minimizing the difference between model and measurement for each firing and receiving mode. FIG. 12 parameters sets like parameter sets 280, 290 and 300, but for different tubular geometries, different numbers of tubulars, and various transmitter firing and receiver reception modes and/or other parameters, may be forward modeled and used with inversion so that logging data can cover a wide variety of casing thicknesses, casing numbers and compositions.

Figure 13:
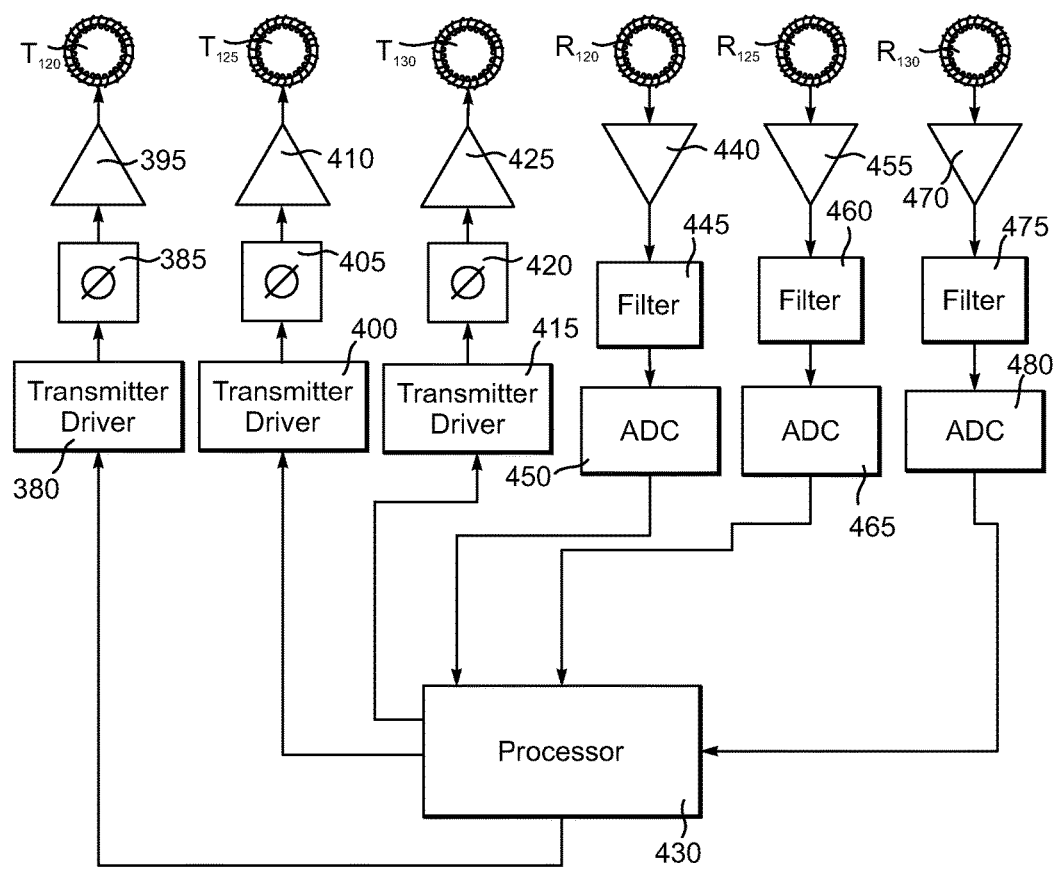
FIG. 13 is a block diagram depicting exemplary driving and sensing circuitry.

Exemplary electronics for driving the transmitters $T_{120}$, $T_{125}$ and $T_{130}$ and processing signals received by the receivers $R_{120}$, $R_{125}$ and $R_{130}$, respectively, may be understood by referring now to FIG. 1 and to the block diagram depicted in FIG. 13. Here, the transmitters $T_{120}$, $T_{125}$ and $T_{130}$ and the receivers $R_{120}$, $R_{125}$ and $R_{130}$ are schematically represented as wire coils for simplicity of illustration. Referring specifically to FIG. 13, the transmitter $T_{120}$ is energized by way of a transmitter driver 380. The transmitter driver 380 delivers an oscillating signal to a phase shifter 390. The output of the phase shifter 390 is delivered to an amplifier 395. The output of the amplifier 395 is tied to the transmitter $T_{120}$. The output current of the transmitter driver 380 may take on a variety of waveforms, such as sine wave, square wave or other and is preferably pulsed. The amplifier 395 may be advantageously configured to operate as an automated gain control (AGC) amplifier to accommodate variations in the transmitter current delivered to the transmitter $T_{120}$. The skilled artisan will appreciate that the transmitter current delivered to the transmitter $T_{120}$ is a function of the conditions of the casing being inspected and thus the AGC functionality can accommodate these fluctuations in transmitter current. The transmitter $T_{125}$ similarly receives a pulsed signal from a transmitter driver 400 by way of a phase shifter 405 and an amplifier 410 and the transmitter $T_{130}$ similarly receives a pulsed signal from a transmitter driver 415 by way of a phase shifter 420 and an amplifier 425. The phase shifters 385, 405 and 420 enabled transmission of phase outputs for implementing Mode 4 described above. The transmitter drivers 380, 400 and 415 may be tied to and otherwise controlled by a processor 430, which may be a microprocessor, an application specific integrated circuit or other type of integrated circuit. The processor 430 and the electronics circuitry may be positioned in the electronics housing 70 (see FIG. 1) or even in the surface electronics 14 if desired if the support cable 13 is a wireline. Power may be supplied to the transmitter drivers 380, 400 and 415 by a power supply (not shown) in the tool 10 or via the support cable 13 if configured as a wireline. The processor 430 can set the pulsed widths, firing intervals and currents for the transmitter drivers 380, 400 and 415. In an exemplary embodiment, the peak transmitter current may be about 5 to 500 milliamps.

The receiver $R_{120}$ receives the pulsed eddy current magnetic field and outputs an induced electromotive force (EMF) signal to an amplifier 440. The amplifier 440 outputs an amplified signal to a filter 445, which may be a band pass filter or low pass filter as desired. The output of the filter 445 is delivered to an analog-to-digital converter (ADC) logic block 450. The ADC logic block 450 receives the output of the filter and digitizes the signal. The ADC logic block 450 then delivers its output to the processor 430. The processor 430 will perform the logic processes as desired in the various firing and receiving modes. The processor 430 may be operable to perform the modeling and inversion calculations described above, or they may be performed by the surface electronics 14. The receivers $R_{125}$ and $R_{130}$ are similarly connected to an amplifier 455, a filter 460 and an ADC logic block 465, and an amplifier 470, a filter 475 and an ADC logic block 480, respectively. Various levels of integration are envisioned. For example, in lieu of dedicated channels (i.e., dedicated amplifiers, filters, EMF measure blocks for each transmitter and receiver) single driving and reception circuitry may tie to multiple antennae by way of one or more multiplexers. In addition, the filtering, driving and other signal processing may be integrated into one, a few or many integrated circuits and devices.

Figure 14:
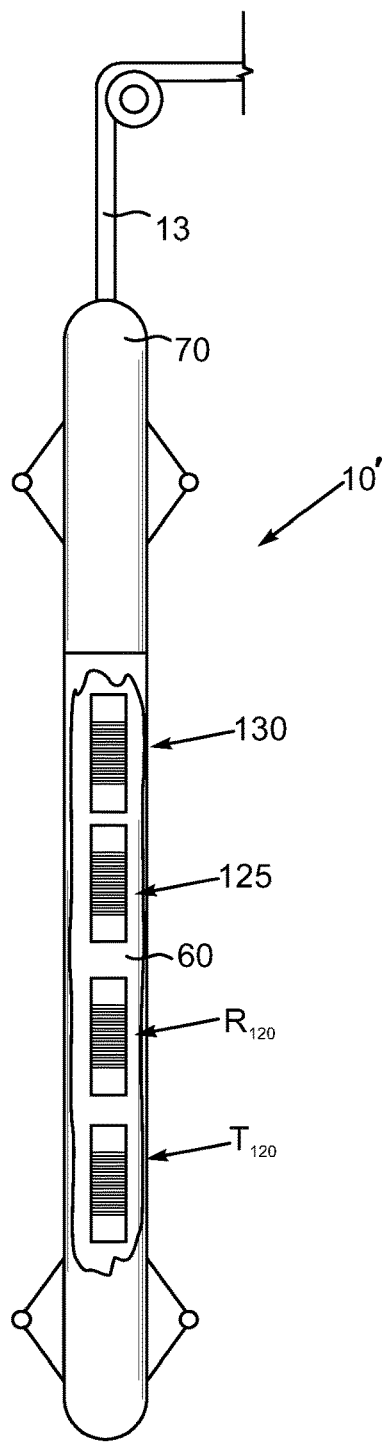
FIG. 14 is a side view of another alternate exemplary downhole logging tool.

Some of the disclosed embodiments include co-located transmitters and receivers and equal longitudinal spacing between various components. However, other configurations may be used. For example, FIG. 14 depicts a side view of an alternate exemplary downhole logging tool 10'. FIG. 14 is simplified in that the formation and casing are not depicted. The downhole logging tool 10' may be substantially similar to the downhole logging tool 10 embodiment described and depicted above and thus may include a sensor housing 60 and an electronics housing 70 and be supported by way of a cable 13. Here, however, the transmitter $T_{120}$ and the receiver $R_{120}$ are longitudinally spaced and not co-located while the transmitter/receiver modules 125 and 130 are equally spaced from each other but with different spacings from the transmitter $T_{120}$. Of course, this arrangement may still use transmitter grouping and firings as described above. But the tool response, as modeled and inverted, will be different than the other embodiments. Of course, other than three transmitter and receiver pairs may be used with or without co-location.

Figure 15:
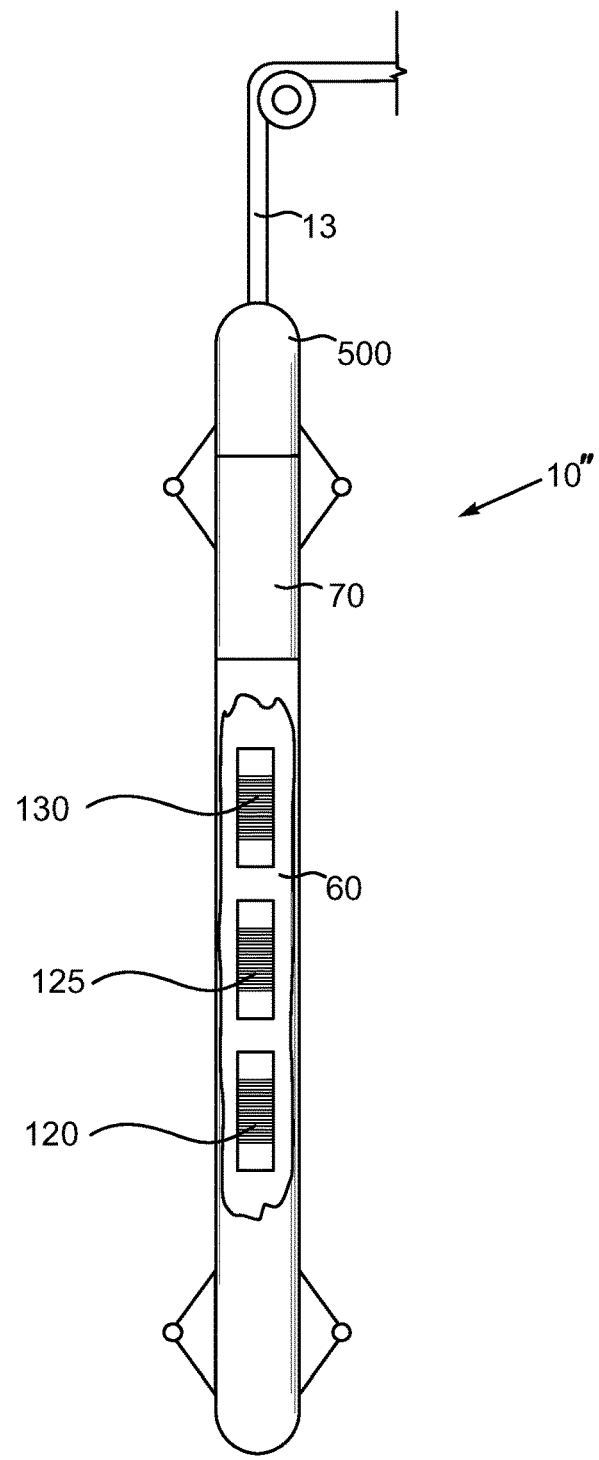
FIG. 15 is a side view of another alternate exemplary downhole logging tool.

As noted briefly above, any of the disclosed embodiments of the downhole logging tool may be operated on a wire line or slick line basis. For example, FIG. 15 depicts a side view of a downhole logging tool 10'', which is suspended from a cable 13 that is a slick line as opposed to a wire line. In this context, a power and data storage sonde 500 may be connected to the electronics housing 70 or elsewhere to provide downhole power via batteries and data storage. In other respects, the casing inspection tool 10'' may be substantially similar to the other disclosed embodiments and thus include a sensor housing 60, and the transmitter/receiver modules 120, 125 and 130 (or any alternatives).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A downhole logging tool for inspecting one or more well tubulars, comprising:
    a housing adapted to be supported in the one or more well tubulars by a support cable;
    a first transmitter, a second transmitter and a third transmitter positioned in longitudinally spaced-apart relation in the housing and being operable to generate magnetic fields, the first transmitter having a first length, the second transmitter having a second length and the third transmitter having a third length;
    driving circuitry operatively coupled to the first transmitter, the second transmitter and the third transmitter to selectively fire the first transmitter, the second transmitter and the third transmitter in multiple transmission modes to generate magnetic fields to stimulate pulsed eddy currents in the one or more well tubulars wherein a first transmission mode of the multiple transmission modes is the simultaneous firing of the first transmitter, the second transmitter and the third transmitter and in that first transmission mode the first transmitter, the second transmitter and the third transmitter function like a single transmitter having a length approximately equal to the sum of the first, second and third lengths;
    a first receiver positioned in the housing to sense decaying magnetic fields created by the pulsed eddy currents; and
    electronic circuitry operatively coupled to the first receiver to determine a parameter of interest of the one or more well tubulars from the sensed decaying magnetic fields.

2. The downhole logging tool of claim 1, wherein the second transmitter is positioned between the first transmitter and the third transmitter, a second transmission mode of the transmission modes comprises the simultaneous firing of the first transmitter and the third transmitter with a first phase and the second transmitter with a second phase substantially 180° out of phase with the first phase to focus the magnetic fields lateral to the second transmitter.

3. The downhole logging tool of claim 1, wherein the second transmitter is positioned between the first transmitter and the third transmitter, a third transmission mode of the transmission modes comprises the firing of the second transmitter.

4. The downhole logging tool of claim 1, comprising an insulating sleeve positioned in the housing, the first transmitter, the second transmitter and the third transmitter and the first receiver being mounted on the insulating sleeve.

5. The downhole logging tool of claim 4, wherein the insulating sleeve comprises at least three insulating segments coupled together, each of the first transmitter, the second transmitter and the third transmitter being mounted on one of the insulating segments.

6. The downhole logging tool of claim 1, wherein the first receiver is co-located with one of the transmitters.

7. The downhole logging tool of claim 1, comprising a second receiver and a third receiver positioned in the housing.

8. The downhole logging tool of claim 7, wherein the second receiver is co-located with the first transmitter, the third receiver is co-located with the third transmitter and the first receiver is co-located with the second transmitter.

9. The downhole logging tool of claim 7, wherein each of the receivers comprises a wire coil.

10. The downhole logging tool of claim 1, wherein the first receiver comprises a magnetometer.

11. The downhole logging tool of claim 1, wherein the driving circuitry and the electronic circuitry are positioned in the housing.

12. The downhole logging tool of claim 1, wherein the driving circuitry and the electronic circuitry are not positioned in the housing.

13. The downhole logging tool of claim 1, wherein the parameter of interest comprises a thickness of the one or more well tubulars.

14. A method of downhole logging a well having one or more well tubulars, comprising:
    suspending a housing in the one or more well tubulars by a support cable, the housing including a first transmitter, a second transmitter and a third transmitter positioned in longitudinally spaced-apart relation and being operable to generate magnetic fields, the first transmitter having a first length, the second transmitter having a second length and the third transmitter having a third length;
    selectively firing the first transmitter, the second transmitter and the third transmitter in at least one of multiple transmission modes to generate magnetic fields to stimulate pulsed eddy currents in the one or more well tubulars wherein a first transmission mode of the multiple transmission modes is the simultaneous firing of the first transmitter, the second transmitter and the third transmitter and in that first transmission mode the first transmitter, the second transmitter and the third transmitter function like a single transmitter having a length approximately equal to the sum of the first, second and third lengths;
    sensing with a first receiver positioned in the housing decaying magnetic fields created by the pulsed eddy currents; and
    determining a parameter of interest of the one or more well tubulars from the sensed decaying magnetic fields.

15. The method of claim 14, wherein the second transmitter is positioned between the first transmitter and the third transmitter, a second transmission mode of the transmission modes comprises simultaneously firing the first transmitter and the third transmitter with a first phase and the second transmitter with a second phase substantially 180° out of phase with the first phase to focus the magnetic fields lateral to the second transmitter.

16. The method of claim 14, wherein the second transmitter is positioned between the first transmitter and the third transmitter, a third transmission mode of the transmission modes comprises firing the second transmitter.

17. The method of claim 14, wherein the first receiver is co-located with one of the transmitters.

18. The method of claim 14, wherein the housing includes a second receiver and a third receiver, the method comprising simultaneously firing the first transmitter, the second transmitter and the third transmitter whereby the first transmitter, the second transmitter and the third transmitter function like a single transmitter having a length approximately equal to the sum of the first, second and third lengths, sensing the decaying magnetic fields with the second and the third receivers and taking the differential of the decaying magnetic decaying magnetic fields sensed by the second and third receivers.

19. The method of claim 18, wherein the second receiver being co-located with the first transmitter, the third receiver being co-located with the third transmitter and the first receiver being co-located with the second transmitter.

20. The method of claim 14, wherein the first transmitter, the second transmitter, the third transmitter and the first receiver each comprises a wire coil.

21. The method of claim 14, wherein the first receiver comprises a magnetometer.

22. The method of claim 14, wherein the electronics are positioned in the housing.

23. The method of claim 14, wherein the electronics are not positioned in the housing.

24. The method of claim 14, wherein the parameter of interest comprises a thickness of the one or more well tubulars.

25. The method of claim 14, wherein the determining the parameter of interest comprises forward modeling a tool response of the tool and determining the parameter of interest by comparing the modeled tool response with measured tool response using inversion.

26. A method of manufacturing a downhole logging tool for inspecting one or more well tubulars, comprising:
fabricating a housing adapted to be supported in the well casing by a support cable;
positioning a first transmitter, a second transmitter and a third transmitter in longitudinally spaced-apart relation in the housing, the first transmitter, the second transmitter and third transmitter being operable to generate magnetic fields, the first transmitter having a first length, the second transmitter having a second length and the third transmitter having a third length;
positioning a first receiver in the housing to sense decaying magnetic fields created by the pulsed eddy currents; and
operatively coupling driving circuitry to the first transmitter, the second transmitter and the third transmitter to selectively fire the first transmitter, the second transmitter and the third transmitter in multiple transmission modes to generate magnetic fields to stimulate pulsed eddy currents in the one or more well tubulars wherein a first transmission mode of the multiple transmission modes is the simultaneous firing of the first transmitter, the second transmitter and the third transmitter and in that first transmission mode the first transmitter, the second transmitter and the third transmitter function like a single transmitter having a length approximately equal to the sum of the first, second and third lengths.

27. The method of claim 26, comprising operatively coupling electronic circuitry to the first receiver to determine the parameter of interest.

28. The method of claim 26, comprising positioning a second receiver and a third receiver in the housing.

29. The method of claim 28, wherein the first receiver is co-located with the first transmitter, the second receiver is co-located with the second transmitter and the third receiver is co-located with the third transmitter.

30. The method of claim 28, comprising mounting the first transmitter, the second transmitter and the third transmitter and the first receiver on an insulating sleeve.

* * * * *